United States Patent
Zhu et al.

(10) Patent No.: US 12,503,004 B2
(45) Date of Patent: Dec. 23, 2025

(54) CONTACTOR OPERATION MONITORING FOR MULTI-VOLTAGE VEHICLE OPERATION

(71) Applicant: GM Global Technology Operations LLC, Detroit, MI (US)

(72) Inventors: Yongjie Zhu, Troy, MI (US); Chunhao J. Lee, Troy, MI (US); Suresh Gopalakrishnan, Troy, MI (US); Venkatesh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 735 days.

(21) Appl. No.: 17/943,404

(22) Filed: Sep. 13, 2022

(65) Prior Publication Data

US 2024/0083291 A1  Mar. 14, 2024

(51) Int. Cl.
| | |
|---|---|
| *H02J 7/00* | (2006.01) |
| *B60L 53/80* | (2019.01) |
| *B60L 58/18* | (2019.01) |
| *H02J 7/14* | (2006.01) |

(52) U.S. Cl.
CPC .............. *B60L 53/80* (2019.02); *B60L 58/18* (2019.02)

(58) Field of Classification Search
CPC .......... B60L 53/18; B60L 53/80; B60L 53/20
USPC ....................................................... 320/134
See application file for complete search history.

(56) References Cited

U.S. PATENT DOCUMENTS

| | | | |
|---|---|---|---|
| 11,650,259 B2 * | 5/2023 | Bertness | B60L 58/18 |
| | | | 429/49 |
| 12,334,289 B2 * | 6/2025 | Miura | H01H 47/002 |
| 2012/0175178 A1 * | 7/2012 | Iwakami | B62K 11/10 |
| | | | 180/218 |
| 2014/0136038 A1 * | 5/2014 | Bissontz | B60W 10/26 |
| | | | 903/930 |
| 2015/0002095 A1 * | 1/2015 | Wada | H02J 7/0013 |
| | | | 320/112 |
| 2015/0054517 A1 * | 2/2015 | Yonezaki | B60L 3/0046 |
| | | | 324/418 |
| 2015/0061376 A1 * | 3/2015 | Hartl | B60L 3/04 |
| | | | 307/116 |
| 2015/0197153 A1 * | 7/2015 | Luedtke | B60L 3/04 |
| | | | 324/503 |
| 2016/0001768 A1 * | 1/2016 | Lennevi | B60W 10/00 |
| | | | 290/38 R |
| 2016/0193926 A1 * | 7/2016 | Abraham | B60W 20/50 |
| | | | 180/65.285 |
| 2018/0152043 A1 * | 5/2018 | Geng | H01M 50/296 |
| 2018/0272870 A1 * | 9/2018 | Burkman | H02H 9/001 |
| 2019/0106011 A1 * | 4/2019 | Zacher | B60L 53/36 |

(Continued)

*Primary Examiner* — Alexis B Pacheco
(74) *Attorney, Agent, or Firm* — CANTOR COLBURN LLP (57) ABSTRACT

A system in a vehicle includes a plurality of contactors to open or close a connection from two or more battery packs that power one or more motors of the vehicle to move the vehicle. The system also includes a controller to control the plurality of contactors to connect the two or more battery packs in series according to one of a plurality of modes of operation or to connect the two or more battery packs in parallel according to another of the plurality of modes of operation, and to control the plurality of contactors to test an operation of one or more of the plurality of contactors.

20 Claims, 8 Drawing Sheets

(56) References Cited

U.S. PATENT DOCUMENTS

| | | | | |
|---|---|---|---|---|
| 2019/0348664 | A1* | 11/2019 | Kim | H01M 50/296 |
| 2020/0018796 | A1* | 1/2020 | Conell | G01R 31/385 |
| 2020/0317076 | A1* | 10/2020 | Wang | B60L 3/0023 |
| 2020/0339048 | A1* | 10/2020 | Ferré | H02J 1/10 |
| 2021/0078442 | A1* | 3/2021 | Prasad | B60L 58/19 |
| 2021/0097785 | A1* | 4/2021 | Zhang | G07C 5/0808 |
| 2021/0151726 | A1* | 5/2021 | Hinterberger | H02J 1/082 |
| 2021/0328452 | A1* | 10/2021 | Creviston | B60L 3/0046 |
| 2022/0158314 | A1* | 5/2022 | Krieg | G01R 31/3835 |
| 2022/0268841 | A1* | 8/2022 | Kim | G01R 31/3278 |
| 2022/0311269 | A1* | 9/2022 | Ishihara | H02J 7/0063 |
| 2022/0416552 | A1* | 12/2022 | Yamauchi | H02J 7/0068 |
| 2023/0335995 | A1* | 10/2023 | Brooker | H02J 3/322 |
| 2024/0113364 | A1* | 4/2024 | Gudapati | B60L 50/10 |
| 2024/0174130 | A1* | 5/2024 | Lidström | B60L 58/21 |
| 2024/0317084 | A1* | 9/2024 | Janarthanam | H02J 7/0047 |

\* cited by examiner

CONTACTOR OPERATION MONITORING FOR MULTI-VOLTAGE VEHICLE OPERATION

INTRODUCTION

The subject disclosure relates to contactor operation monitoring for multi-voltage vehicle operation.

An electric or hybrid vehicle (e.g., automobile, truck, construction equipment, farm equipment, automated factory equipment) may include two or more battery packs that power the propulsion of the vehicle. Typically, these packs are connected in parallel for vehicle operation. That is, the two or more battery packs are connected in parallel to supply the power inverter module (PIM) of each motor. A vehicle may include one or more front and rear motors, for example. In some scenarios, the vehicle may benefit from more power. In those scenarios, the battery packs may be connected in series to supply more power to the PIM of each motor. The single, parallel, or series connection of the battery packs may be controlled via contactors. Accordingly, it is desirable to provide contactor operation monitoring for multi-voltage vehicle operation.

SUMMARY

In one exemplary embodiment, a system in a vehicle includes a plurality of contactors to open or close a connection from two or more battery packs that power one or more motors of the vehicle to move the vehicle. The system also includes a controller to control the plurality of contactors to connect the two or more battery packs in series according to one of a plurality of modes of operation or to connect the two or more battery packs in parallel according to another of the plurality of modes of operation, and to control the plurality of contactors to test an operation of one or more of the plurality of contactors.

In addition to one or more of the features described herein, the controller tests the operation of the one or more of the plurality of contactors prior to initiating one of the plurality of modes of operation.

In addition to one or more of the features described herein, the controller tests the operation of the one or more of the plurality of contactors prior to terminating one of the plurality of modes of operation.

In addition to one or more of the features described herein, the system also includes one or more pre-charge resistors.

In addition to one or more of the features described herein, the controller controls the plurality of contactors to connect the two or more battery packs to one or more of the one or more pre-charge resistors during an activation or a deactivation of any of the plurality of modes of operation.

In addition to one or more of the features described herein, a first contactor among the plurality of contactors connects a first battery pack among the two or more battery packs to a first pre-charge resistor among the one or more pre-charge resistors and a second contactor and a third contactor among the plurality of contactors connect the first battery pack to the one or more motors.

In addition to one or more of the features described herein, the controller controls the first contactor to close while controlling the second contactor and the third contactor to open to test the operation of the second contactor and the third contactor based on whether current flows through the first pre-charge resistor.

In addition to one or more of the features described herein, the controller controls the second contactor to open while controlling the third contactor to close to test the operation of the second contactor based on whether voltage across the one or more motors is dropping.

In addition to one or more of the features described herein, the controller controls the third contactor to open while controlling the second contactor to close to test the operation of the third contactor based on whether voltage across the one or more motors is dropping.

In addition to one or more of the features described herein, the controller obtains voltage measurements through each of the two or more battery packs individually.

In another exemplary embodiment, a method of assembling a system in a vehicle includes arranging a plurality of contactors to open or close a connection from two or more battery packs that are configured to power one or more motors of the vehicle to move the vehicle. The method also includes configuring a controller to control the plurality of contactors to connect the two or more battery packs in series according to one of a plurality of modes of operation or to connect the two or more battery packs in parallel according to another of the plurality of modes of operation, and to control the plurality of contactors to test an operation of one or more of the plurality of contactors.

In addition to one or more of the features described herein, the configuring the controller includes the controller testing the operation of the one or more of the plurality of contactors prior to initiating one of the plurality of modes of operation.

In addition to one or more of the features described herein, the configuring the controller includes the controller testing the operation of the one or more of the plurality of contactors prior to terminating one of the plurality of modes of operation.

In addition to one or more of the features described herein, the method also includes arranging one or more pre-charge resistors.

In addition to one or more of the features described herein, the configuring the controller includes the controller controlling the plurality of contactors to connect the two or more battery packs to one or more of the one or more pre-charge resistors during an activation or a deactivation of any of the plurality of modes of operation.

In addition to one or more of the features described herein, the arranging the plurality of contactors includes a first contactor among the plurality of contactors connecting a first battery pack among the two or more battery packs to a first pre-charge resistor among the one or more pre-charge resistors and a second contactor and a third contactor among the plurality of contactors connecting the first battery pack to the one or more motors.

In addition to one or more of the features described herein, the configuring the controller includes the controller controlling the first contactor to close while controlling the second contactor and the third contactor to open to test the operation of the second contactor and the third contactor based on whether current flows through the first pre-charge resistor.

In addition to one or more of the features described herein, the configuring the controller includes the controller controlling the second contactor to open while controlling the third contactor to close to test the operation of the second contactor based on whether voltage across the one or more motors is dropping.

In addition to one or more of the features described herein, the configuring the controller includes the controller controlling the third contactor to open while controlling the second contactor to close to test the operation of the third contactor based on whether voltage across the one or more motors is dropping.

In addition to one or more of the features described herein, the configuring the controller includes the controller obtaining voltage measurements through each of the two or more battery packs individually.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to contactor operation monitoring for multi-voltage vehicle operation. As previously noted, an electric or hybrid vehicle may include two or more battery packs. A battery pack refers to a plurality of batteries or battery cells that are managed by a battery management system (BMS). The battery pack and associated BMS may be referred to together as a smart battery pack. As also noted, the battery packs are typically connected in parallel during vehicle operation. Thus, for example, two 400 volt (V) battery packs may be arranged in parallel to supply 400 V to each PIM of each motor of the vehicle, as well as to different loads (e.g., integrated power electronics, air conditioning system).

Exemplary embodiments involve monitoring the operation of the contactors that facilitate changing a connection configuration of the two or more battery packs to be in parallel or in series with one or more PIMs and one or more loads. The change may be done during vehicle operation, which refers to the vehicle being ready to drive or being driven rather than being recharged (i.e., the battery packs of the vehicle propulsion system are supplying power or are absorbing regenerative braking power). Aspects of the contactor operation monitoring detailed herein may be performed to determine if a particular connection configuration may be initiated (i.e., as a pre-check). Other aspects of the contactor monitoring detailed herein may be performed to determine if a particular connection configuration may be shut down (i.e., as a post-check) in order to make a change in the connection configuration or based on vehicle shutdown. For explanatory purposes, the multi-voltage operation is described using two battery packs. However, any number of battery packs may be used and dynamically changed between series and parallel connections or to single-pack connection. Thus, the contactor operation monitoring may be extended to any number of contactors with similar functions to those detailed herein.

Figure 1:
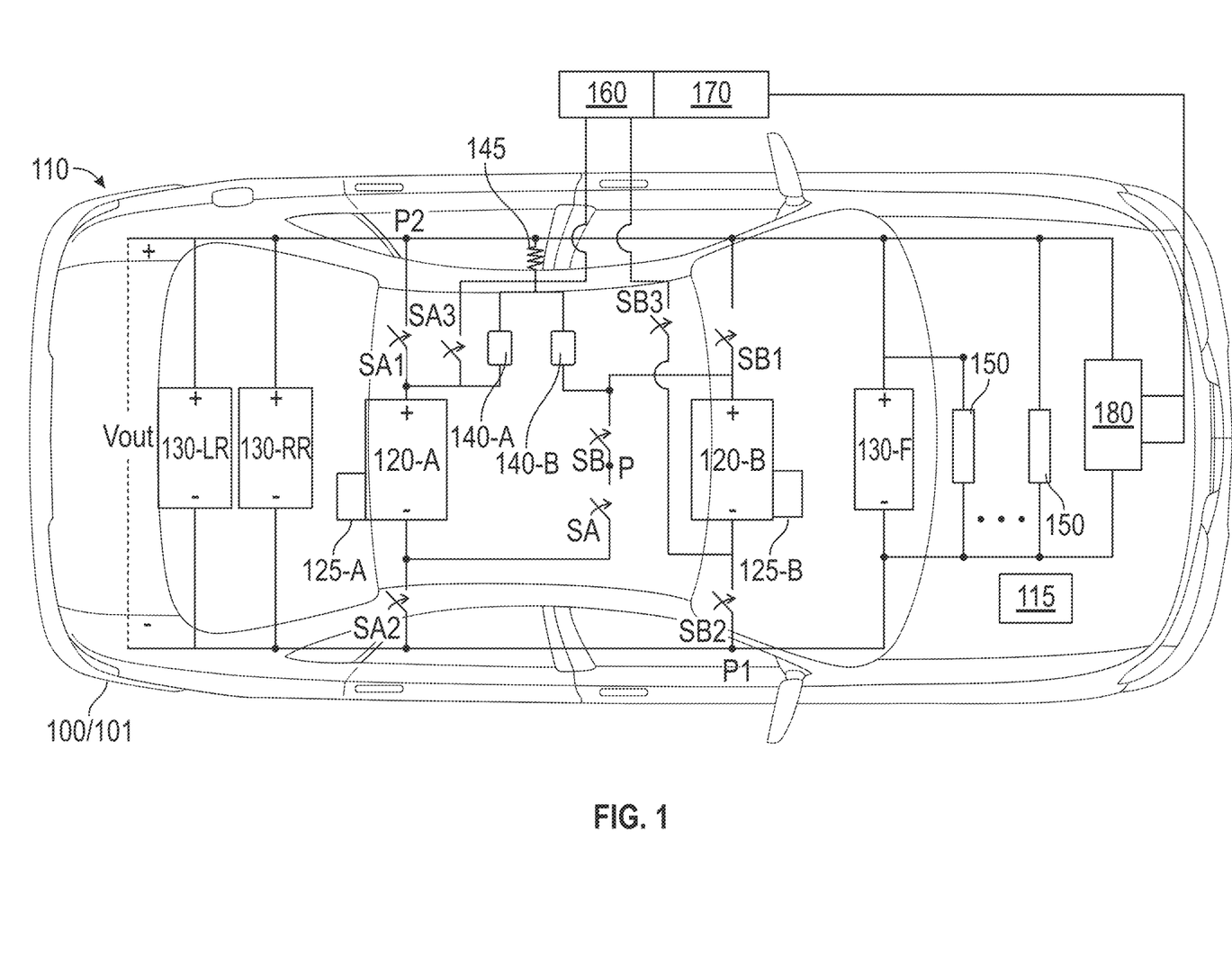
FIG. 1 is a block diagram of a vehicle with a multi-voltage propulsion system that implements contactor monitoring.

In accordance with an exemplary embodiment, FIG. 1 is a block diagram of a vehicle 100 with a multi-voltage propulsion system 110 that implements contactor monitoring. The exemplary vehicle 100 is an automobile 101. Two exemplary battery packs 120-A and 120-B (generally referred to as 120) supply a front motor 130-F, left rear motor 130-LR, and right rear motor 130-RR (generally referred to as motor 130). The battery packs 120 also supply loads 150. The battery packs 120 may be charged by a direct current fast charger (DCFC) 160 or by an on-board charging module (OBCM) 180 that is supplied by the alternating current (AC) grid 170. Each of the battery packs 120-A and 120-B is shown with a respective BMS 125-A and 125-B (generally referred to as 125).

The BMS 125 of each battery pack 120 may indicate charge state, temperature, voltage, current, and other parameters used to make decisions such as, for example, whether charging is needed. These parameters may also indicate when a dynamic change (e.g., from parallel to serial connection of the battery packs 120) may be implemented. In addition to these parameters, the pre-checks and post-checks detailed herein may also be used to determine whether or when a dynamic change in connection configuration may be implemented. For example, to change from parallel to serial connection of the battery packs 120, a post-check may be done for contactors involved in the parallel connection and a pre-check may be done for contactors involved in the serial connection. The propulsion system 110 includes the battery packs 120 and motors 130 shown in FIG. 1, in addition to components that are not detailed herein.

The vehicle 100 is shown with a controller 115. The controller 115 may implement the operation monitoring of the contactors used to implement the dynamic change between serial and parallel connection of the battery packs 120 as detailed herein. The exemplary contactors herein include switches SA1, SA2, SA3, SB1, SB2, SB3, SA, SB and pre-charge circuit contactors 140-A and 140-B. The various switches SA1, SA2, SA3, SB1, SB2, SB3, SA, SB that are controlled to facilitate the dynamic change between serial and parallel connection of the battery packs 120 are all shown in the open position in FIG. 1 but may be controlled by the controller 115 to close, as indicated by the arrows.

The switches SA and SB are shown connected in series for redundancy and safety. In alternate embodiments, a single switch may be used instead.

The controller 115 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory of the controller 115 may include non-transitory computer-readable media that stores instructions that, when processed by one or more of the processors of the controller 115, implement the dynamic change.

As indicated in Table 1, when the battery packs 120-A and 120-B are connected in parallel to the motors 130 and loads 150, the switches SA1, SA2, SB1, and SB2 are controlled to be closed. The switches SA3 and SB3 are closed only during charging with the DCFC 160. As also indicated in Table 1, when the battery packs 120-A and 120-B are connected in series to the motors 130 and the loads 150, the switches SA1, SA, SB, and SB2 are controlled to be closed, thereby creating a connection from point P1 through the two battery packs 120-A and 120-B to point P2.

Any loads 150 that cannot accept the higher voltage that results from connection of the battery packs 120 in series may be supplied via a DC-DC converter that reduces the voltage from the battery packs 120 to a voltage accepted by the loads 150. In addition to points P1 and P2, point P between switches SA and SB is also indicated. A first probe voltage VP1 is measured between points P and P1 and a second probe voltage VP2 is measured between points P2 and P. These probe voltages VP1 and VP2 (i.e., voltage measurements of each of the battery packs 120-B and 120-A individually) are discussed with reference to FIG. 8.

As Table 1 indicates, only one of the battery packs 120-A or 120-B may be connected to the motors 130 and loads 150 according to exemplary modes. In this case, only the switches SA1 and SA2 (in the case of battery pack 120-A being connected) or the switches SB1 and SB2 (in the case of battery pack 120-B being connected) are controlled to be closed. Table 1 indicates the alternate operation of the contactors based on which of the battery packs 120 is connected. That is, either switches SB1 and SB2 are open and switches SA1 and SA2 are closed or switches SB1 and SB2 are closed and switches SA1 and SA2 are open.

When the connection between the battery packs 120 is dynamically changed or when one or more battery packs 120 are first activated individually, in parallel, or in series (i.e., in a particular power mode) or when a given power mode is deactivated, an inrush of current into the motors 130 and loads 150 may result from current imbalance between the battery packs 120 and motors 130 or loads 150. To limit inrush current, pre-charge circuit contactors 140-A and 140-B are used to initially divert current flow to the pre-charge resistor 145.

Thus, the pre-charge circuit contactors 140-A and 140-B may be closed initially but remain open during operation in a particular connection configuration. When one or both of the pre-charge circuit contactors 140-A and 140-B are closed, during pre-charge, current through the pre-charge resistor 145 is used to monitor voltage to perform fault protection. Once the monitored voltage is within a threshold value, the pre-charge process is complete, and the pre-charge circuit contactors 140-A and 140-B remain open. The contactor positions during pre-charge are also indicated in Table 1. The pre-check and post-check ensure, among other things, that the pre-charge circuit contactors 140-A and 140-B are open and not stuck in a closed position.

TABLE 1

Contactor positions for various modes.

| contactor | series pre-charge | series operation | parallel pre-charge | parallel operation | single pack pre-charge | single pack operation | shutdown |
|---|---|---|---|---|---|---|---|
| SB2 | closed | closed | open | closed | open/closed | open/closed | open |
| SA1 | open | closed | open | closed | open | closed/open | open |
| 140-B | open | open | open | open | open/closed | open | open |
| 140-A | closed | open | closed | open | closed/open | open | open |
| SB1 | open | open | open | closed | open | open/closed | open |
| SA2 | open | open | closed | closed | closed/open | closed/open | open |
| SB | closed | closed | open | open | open | open | open |
| SA | closed | closed | open | open | open | open | open |

Figure 2:
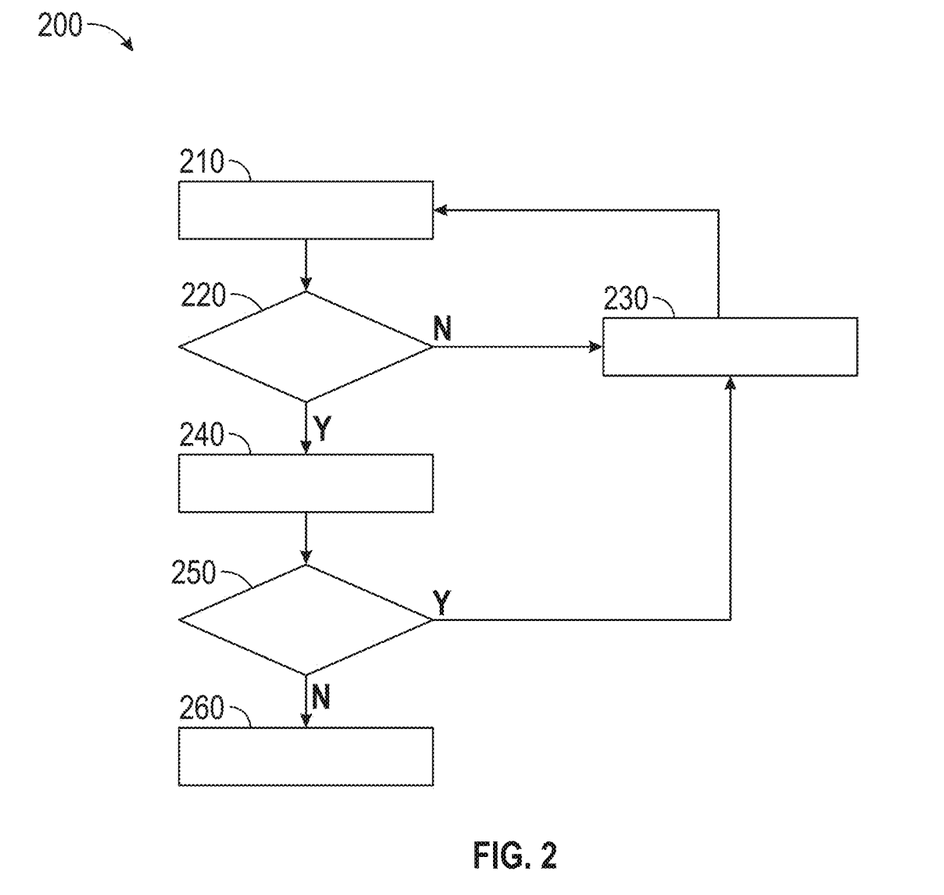
FIG. 2 is a process flow of a method of performing a pre-check of the contactors for series connection of the battery packs according to exemplary embodiments.

FIGS. 2-7 show process flows used to monitor contactor operation during the different modes indicated in Table 1. The controller 115 may implement the processes shown in each of the figures. FIG. 2 is a process flow of a method 200 of performing a pre-check of the contactors for series connection of the battery packs 120 according to exemplary embodiments. At block 210, switches SA1, SA, SB, SB2, and pre-charge circuit contactor 140-A are open. In fact, the vehicle 100 is assumed to be off (i.e., in the shutdown state) such that all the contactors are open. At block 220, a check is done of whether the voltage Vout indicated in FIG. 1 is 0. If all the contactors were open as they should be at this stage, Vout would be 0. Thus, if the check at block 220 indicates that Vout is not 0, then debugging is performed, at block 230, to determine which one or more contactors are not operating properly.

If the check at block 220 indicates that Vout is 0, as it should be, then the pre-charge circuit contactor 140-A is closed, at block 240. Without any other contactor being closed, the pre-charge circuit contactor 140-A being closed should not result in any current through the pre-charge resistor 145. A check is done of whether there is current through the pre-charge resistor 145 at block 250. If the check at block 250 indicates that there is current through the pre-charge resistor 145, then debugging is performed, at block 230. In addition, it is confirmed that switch SA1 and the pre-charge circuit contactor 140-A are operating properly.

If the check at block 250 indicates that there is no current through the pre-charge resistor 145, then pre-charging commences, at block 260, as a first step to connecting the battery packs 120 in series. Specifically, at block 260, switches SB2, SA, and SB, as well as the pre-charge circuit contactor 140-A are closed and switch SA1 is left open. As a result, the battery packs 120-A and 120-B are connected in series from point P1 to the pre-charge resistor 145.

Figure 3:
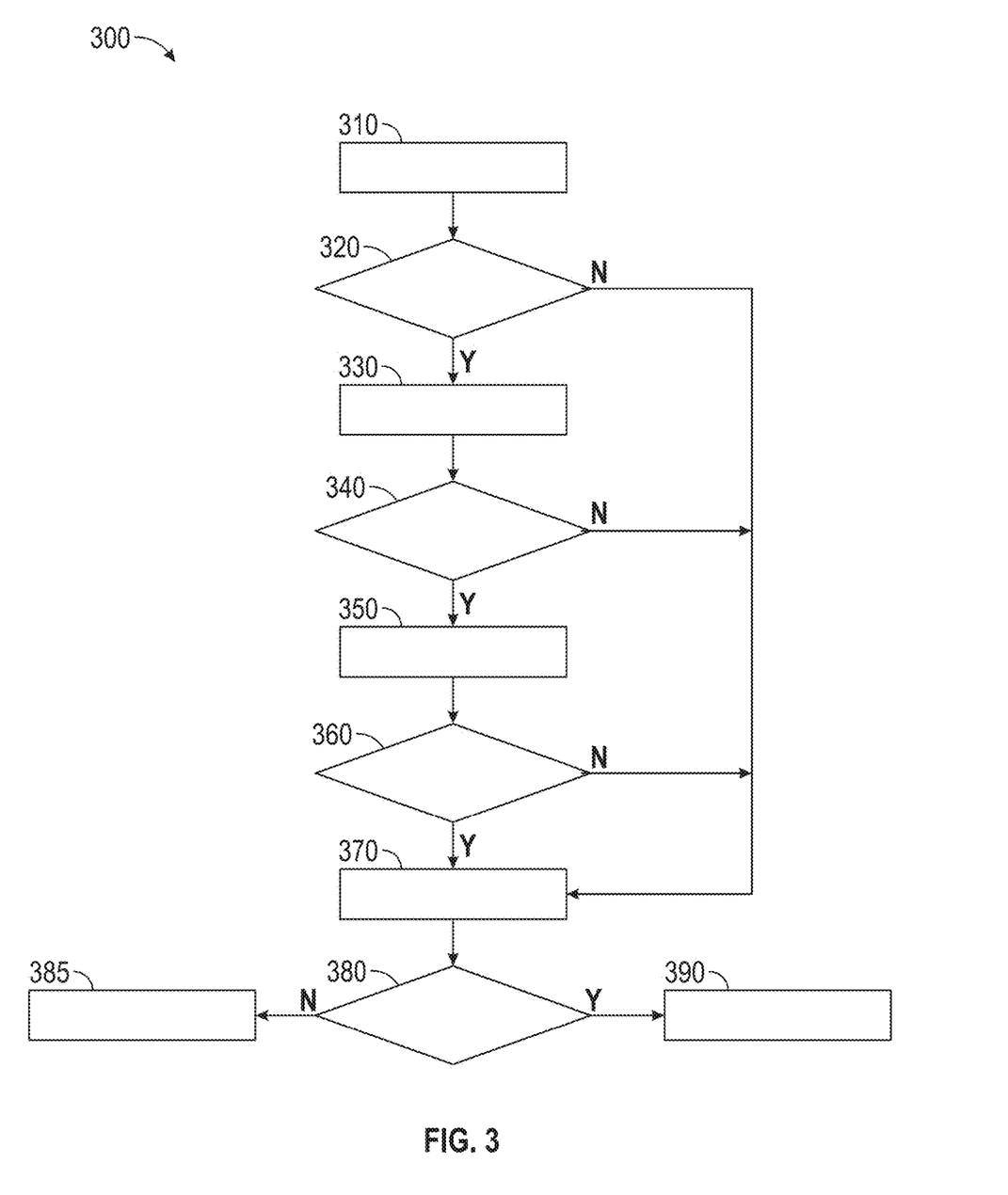
FIG. 3 is a process flow of a method of performing a post-check of the contactors when series connection of the battery packs is terminated according to exemplary embodiments.

FIG. 3 is a process flow of a method 300 of performing a post-check of the contactors when series connection of the battery packs 120 is terminated according to exemplary embodiments. At the start of this post-check process, the switches SA1, SB2, SA, and SB are assumed to be closed and the pre-charge circuit contactors 140-A, 140-B and other switches SA2, SB2 are assumed to be open to facilitate a series connection of the battery packs 120 between the points P1 and P2. At block 310, opening SA1 should cause a drop in the voltage Vout, indicated in FIG. 1. A check is done at block 320 of whether Vout is dropping. If the check at block 320 indicates that the voltage Vout is not dropping, even though it should be, then the processes at block 370 are performed. Specifically, all the switches are opened as in the shutdown mode.

If the check at block 320 indicates that the voltage Vout is dropping, then switch SA1 and pre-charge circuit contactor 140-A are confirmed to be working. In addition, if the check at block 320 indicates that the voltage Vout is dropping, as it should be, then the switch SA is opened and the pre-charge circuit contactor 140-A is closed at block 330. This diverts current from the battery pack 120-A to the pre-charge resistor 145, causing a further drop in voltage Vout.

A check is done at block 340 to determine if this is the case. If the check at block 340 indicates that the voltage Vout is not dropping, even though it should be, then the processes at block 370 are performed. If the check at block 340 indicates that the voltage Vout is dropping, as it should be, then it indicates that the switch SA is not stuck closed (i.e., switch SA is operating correctly). Then switch SB is checked.

At block 350, the switch SB is opened and the switch SA is closed (the switch SA1 remains open, the switch SB2 remains closed, and the pre-charge circuit contactor 140-A remains closed). Like the processes at block 330, the processes at block 350 should divert current from the battery pack 120-A to the pre-charge resistor 145, causing a further drop in voltage Vout. A check is done at block 360 to determine if this is the case. If the check at block 360 indicates that the voltage Vout is not dropping, even though it should be, then the processes at block 370 are performed. If the check at block 360 indicates that the voltage Vout is dropping, as it should be, then it indicates that the switch SB is not stuck closed (i.e., switch SB is operating correctly).

At block 370, all the switches SA1, SA2, SA, SB, SB1, SB2 are in the open position, along with the pre-charge circuit contactors 140-A, 140-B. That is, the switches SA and SB2 and the pre-charge circuit contactor 140-A are opened at block 370 because the other contactors were already open. A check is done at block 380 to determine if the voltage Vout continues to drop as a result. If the check at block 380 indicates that the voltage Vout is not dropping, even though it should be, then debugging is performed at block 385. If the check at block 380 indicates that the voltage Vout is dropping, as it should be, then continuing the shutdown or change process, at block 390, includes switching to parallel connection of the battery packs 120 if that mode is selected.

Figure 4:
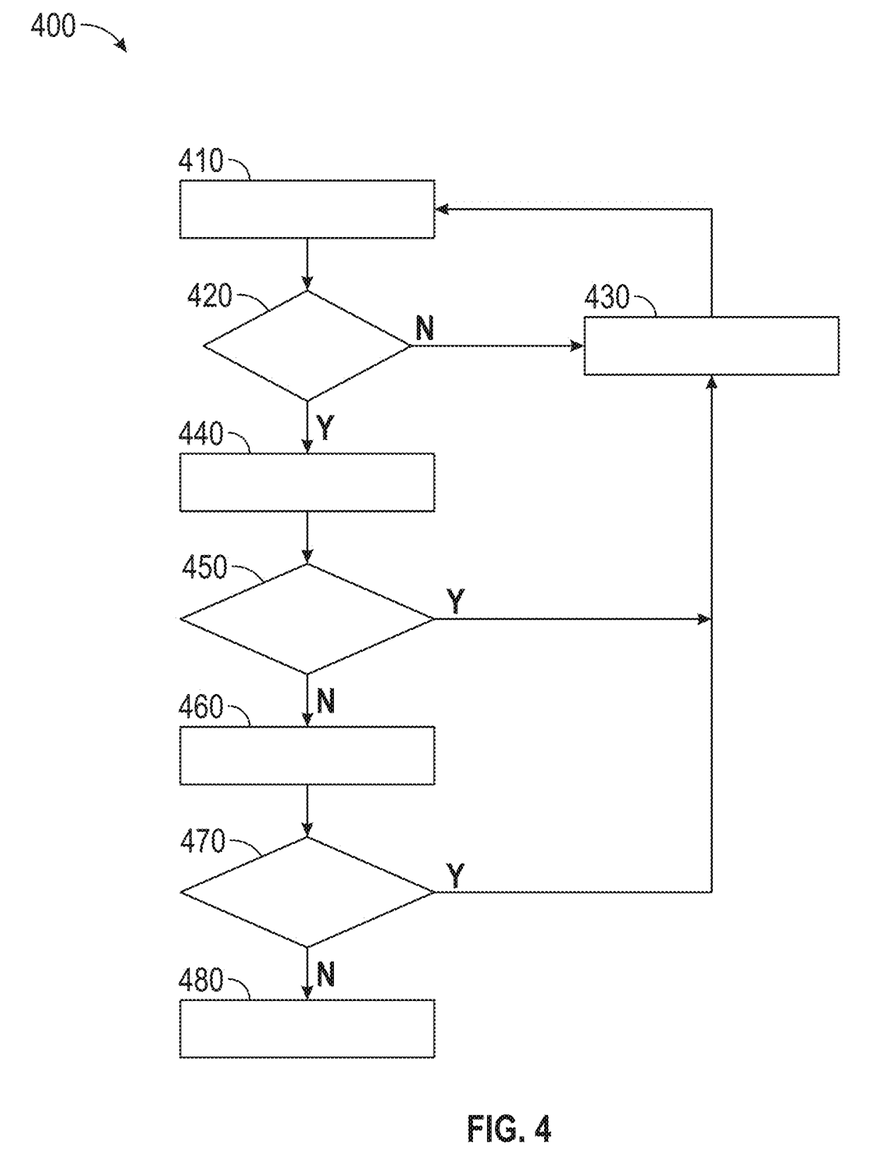
FIG. 4 is a process flow of a method of performing a pre-check of the contactors for parallel connection of the battery packs according to exemplary embodiments.

FIG. 4 is a process flow of a method 400 of performing a pre-check of the contactors for parallel connection of the battery packs 120 according to exemplary embodiments. At block 410, switches SA2, SB1, and SB2, and pre-charge circuit contactors 140-A and 140-B are open. In fact, the vehicle 100 is assumed to be off (i.e., in the shutdown state) such that all the contactors are open. At block 420, a check is done of whether the voltage Vout indicated in FIG. 1 is 0. If all the contactors were open, as they should be at this stage, Vout would be 0. Thus, if the check at block 420 indicates that Vout is not 0, then debugging is performed, at block 430, to determine which one or more contactors are not operating properly.

If the check at block 420 indicates that the voltage Vout is 0, as it should be, then the switch SB1 is closed, at block 440. Without any other contactor being closed, the switch SB1 being closed should not result in any current through the pre-charge resistor 145. A check is done of whether there is current through the pre-charge resistor 145 at block 450. If the check at block 450 indicates that there is current through the pre-charge resistor 145, then it indicates that the switch SB2 is not operating properly (i.e., it is closed when it should be open) and debugging is performed, at block 430.

If the check at block 450 indicates that there is no current through the pre-charge resistor 145, then the switch SB1 is left open and the pre-charge circuit contactor 140-A is closed, at block 460. Without any other contactor being closed, the pre-charge circuit contactor 140-A being closed should not result in any current through the pre-charge resistor 145. A check is done of whether there is current through the pre-charge resistor 145 at block 470. If the check at block 470 indicates that there is current through the pre-charge resistor 145, then it indicates that the switch SA2 is not operating properly and debugging is performed, at block 430. If the check at block 470 indicates that there is no current through the pre-charge 145, which is as it should be, then pre-charging to establish the parallel connection of the battery packs 120 is commenced at block 480. For example, with the pre-charge circuit contactor 140-A closed, the switches SA2 and SB2 are closed to establish a connection between the point P1 and the pre-charge resistor 145.

Figure 5:
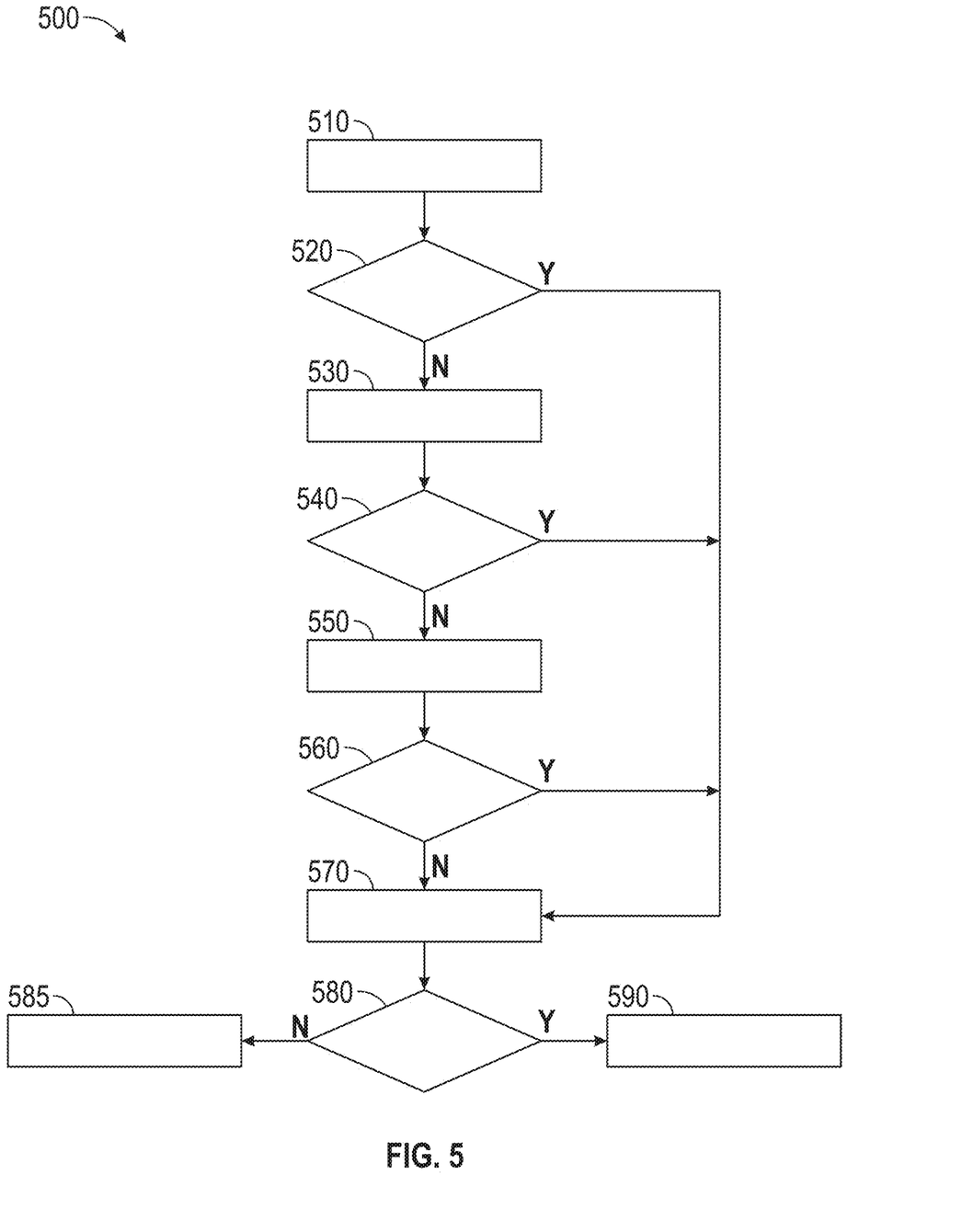
FIG. 5 is a process flow of a method of performing a post-check of the contactors when parallel connection of the battery packs is terminated according to exemplary embodiments.

FIG. 5 is a process flow of a method 500 of performing a post-check of the contactors when parallel connection of the battery packs 120 is terminated according to exemplary embodiments. At the start of this post-check process, the switches SA1, SA2, SB1, and SB2 are assumed to be closed and the pre-charge circuit contactors 140-A, 140-B and other switches SA, SB are assumed to be open to facilitate the parallel connection of the battery packs 120 to the motors 130 and loads 150. At block 510, opening SA2 and SB2 should cause a drop in the voltage Vout, indicated in FIG. 1. A check is done at block 520 of whether Vout is dropping. If the check at block 520 indicates that the voltage Vout is dropping, as it should be, it indicates that the switches SA2 and SB2 are operating properly, and the processes at block 570 are performed. Specifically, all the switches are opened as in the shutdown mode.

If the check at block 520 indicates that the voltage Vout is not dropping, then, at block 530, opening the switch SB1 disconnects the other side of the battery pack 120-B, as well, since one side should already be disconnected based on opening SB2 (at block 510). Thus, a check is done, at block 540, to determine whether the voltage Vout is dropping as a result of opening switch SB1 at block 530. If the check at block 540 indicates that the voltage Vout is dropping (as a result of opening switch SB1 at block 530), then switches SA2 and SB1 are confirmed to be operating correctly and switch SB2 is not operating correctly (i.e., it was stuck closed). The processing at block 570 may then be performed.

If the check at block 540 indicates that the voltage Vout is still not dropping (with switches SA1, SA2, and SB2 open), this indicates that the switch SA2 may be operating incorrectly and there may be an issue with both switches SB1 and SB2. In this case, at block 550, the switch SA1 is opened and the switch SB1 is closed (switches SA2 and SB2 are still open). That is, based on the processes at block 530, only switch SB1 is opened (i.e., only switch SA1 is closed) and, based on the processes at block 550, switch SA1 is opened and only switch SB1 is closed. If this contactor configuration causes a voltage drop at Vout, then it indicates an issue with the switch SA2. Thus, a check is done, at block 560, to determine whether the voltage Vout is dropping as a result of opening switch SA1 and closing switch SB1 at block 550. If the check at block 560 indicates that the voltage Vout is dropping (as a result of opening switch SA1 and closing switch SB1 at block 550), then switches SA1 and SB2 are confirmed to be operating properly and switch SA2 is not operating properly. The processing at block 570 to open all the switches may then be performed.

If the check at block 560 indicates that the voltage Vout is still not dropping (with switches SA2, SA1, and SB2 open), then the battery pack 120-A may have an issue or the switch SB2 may be stuck closed (i.e., both switches SA1 and SA2 may have issues). In this case, the processes at block 570 to open all the switches are still performed. At block 580, a check is done of whether the voltage Vout is dropping based on opening all the switches at block 570. If the check at block 580 indicates that the voltage Vout is not dropping, then debugging is performed at block 585. If the check at block 580 indicates that the voltage Vout is dropping, then the shutdown or battery pack connection change (e.g., from parallel to series) may continue at block 590.

Figure 6:
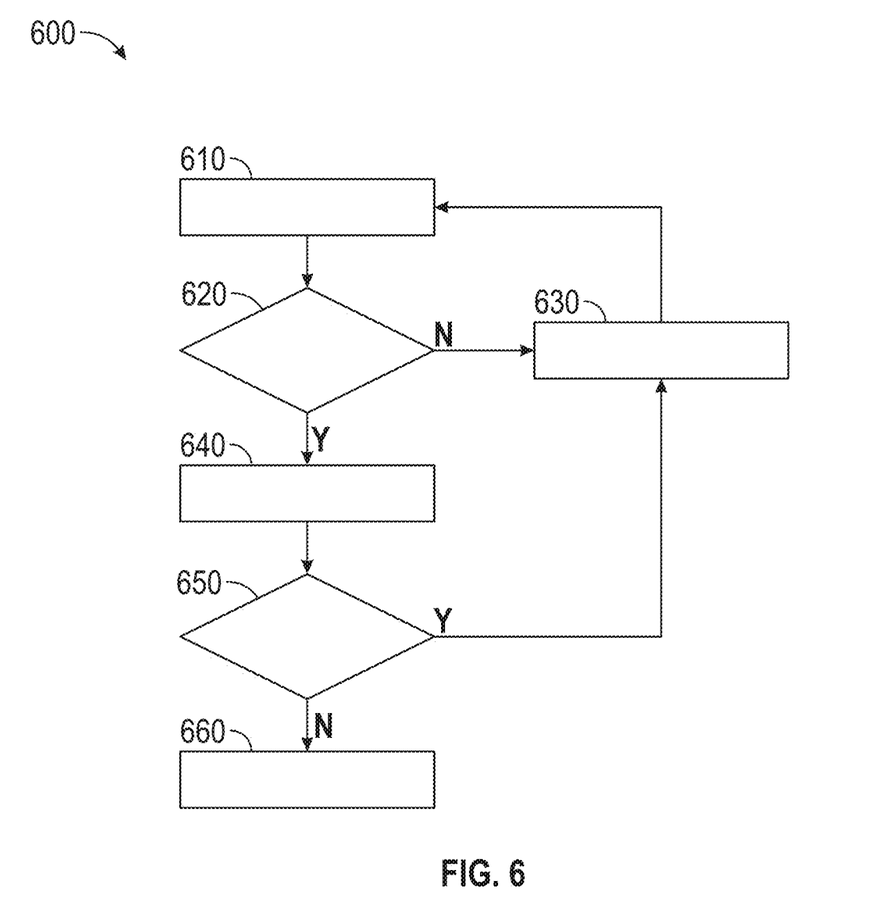
FIG. 6 is a process flow of a method of performing a pre-check of contactor operation to connect a single battery pack according to exemplary embodiments.

FIG. 6 is a process flow of a method 600 of performing a pre-check of contactor operation to connect a single battery pack 120 according to exemplary embodiments. For explanatory purposes, the pre-check that may be performed to connect only the battery pack 120-B is described. At block 610, switches SB1 and SB2, and pre-charge circuit contactor 140-B are open. In fact, the vehicle 100 is assumed to be off (i.e., in the shutdown state) such that all the contactors are open. At block 620, a check is done of whether the voltage Vout indicated in FIG. 1 is 0. If all the contactors were open, as they should be at this stage, Vout would be 0. Thus, if the check at block 620 indicates that Vout is not 0, then debugging is performed, at block 630, to determine which one or more contactors are not operating properly.

If the check at block 620 indicates that Vout is 0, as it should be, then the pre-charge circuit contactor 140-B is closed, at block 640. Without any other contactor being closed, the pre-charge circuit contactor 140-B being closed should not result in any current through the pre-charge resistor 145. A check is done of whether there is current through the pre-charge resistor 145 at block 650. If the check at block 650 indicates that there is current through the pre-charge resistor 145, then debugging is performed, at block 630. In addition, it is confirmed that switch SB2 is not operating properly.

If the check at block 650 indicates that there is no current through the pre-charge resistor 145, then pre-charging commences, at block 660, as a first step to connecting only the battery pack 120-B to the motors 130 and loads 150. Specifically, at block 660, switch SB2 and the pre-charge circuit contactor 140-B are closed and SB1 is left open.

Figure 7:
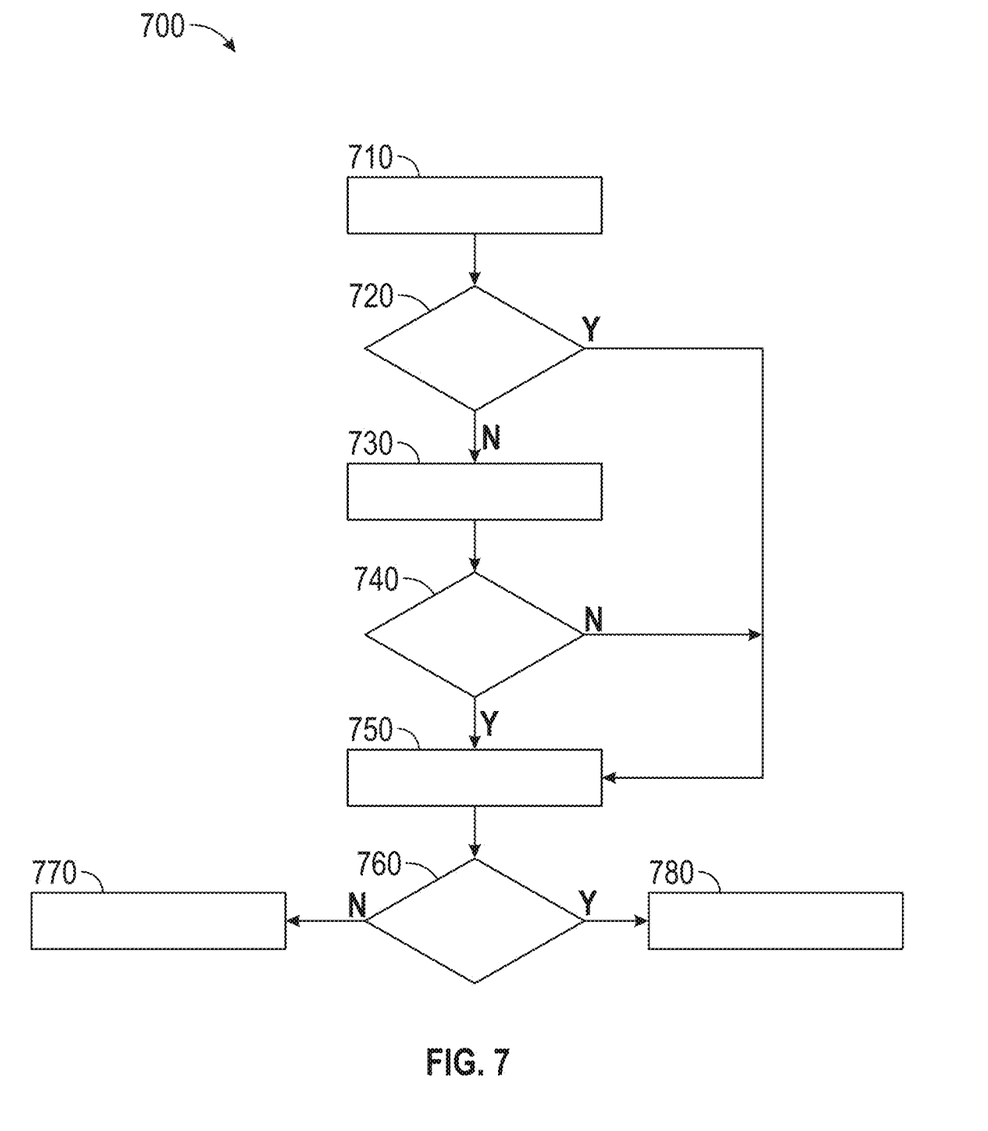
FIG. 7 is a process flow of a method of performing a post-check of the contactors to terminate the connection of a single battery pack according to exemplary embodiments.

FIG. 7 is a process flow of a method 700 of performing a post-check of the contactors to terminate the connection of a single battery pack 120-B according to exemplary embodiments. At the start of this post-check process, the switches SB1 and SB2 are assumed to be closed and the pre-charge circuit contactors 140-A, 140-B and other switches SA, SB are assumed to be open to facilitate the connection of the single battery pack 120-B to the motors 130 and loads 150. At block 710, opening switch SB2 should cause a drop in the voltage Vout indicated in FIG. 1. A check is done at block 720 of whether Vout is dropping. If the check at block 720 indicates that the voltage Vout is dropping, as it should be, then the processes at block 750 are performed. Specifically, all the switches are opened as in the shutdown mode. In addition, switch SB2 is confirmed to be operating properly, because the switch SB2 must be open for the voltage Vout to drop.

If the check at block 720 indicates that the voltage Vout is not dropping, then, at block 730, opening switch SB1 and closing switch SB2 tests switch SB1. That is, if the voltage Vout drops, switch SB1 must be operating properly. A check is done at block 740 of whether Vout is dropping. If the check at block 740 indicates that the voltage Vout is dropping, as it should be, then the switch SB1 is confirmed to be operating properly. If the check at block 740 indicates that the voltage Vout is not dropping, then a potential issue with the operation of switch SB1 is indicated. In either case, the processes at block 750 are performed. Specifically, all the switches SA1, SA2, SA, SB, SB1, SB2 and pre-charge circuit contactors 140-A, 140-B are opened.

At block 760, a check is done of whether the voltage Vout is dropping after all the switches are opened at block 750. If the check at block 760 indicates that the voltage Vout is not dropping, then debugging is performed at block 770. If the check at block 760 indicates that the voltage Vout is dropping, as it should be, then the shutdown or battery pack connection change (e.g., from a single battery pack 120-B to a series or parallel connection) may continue at block 780.

Figure 8:
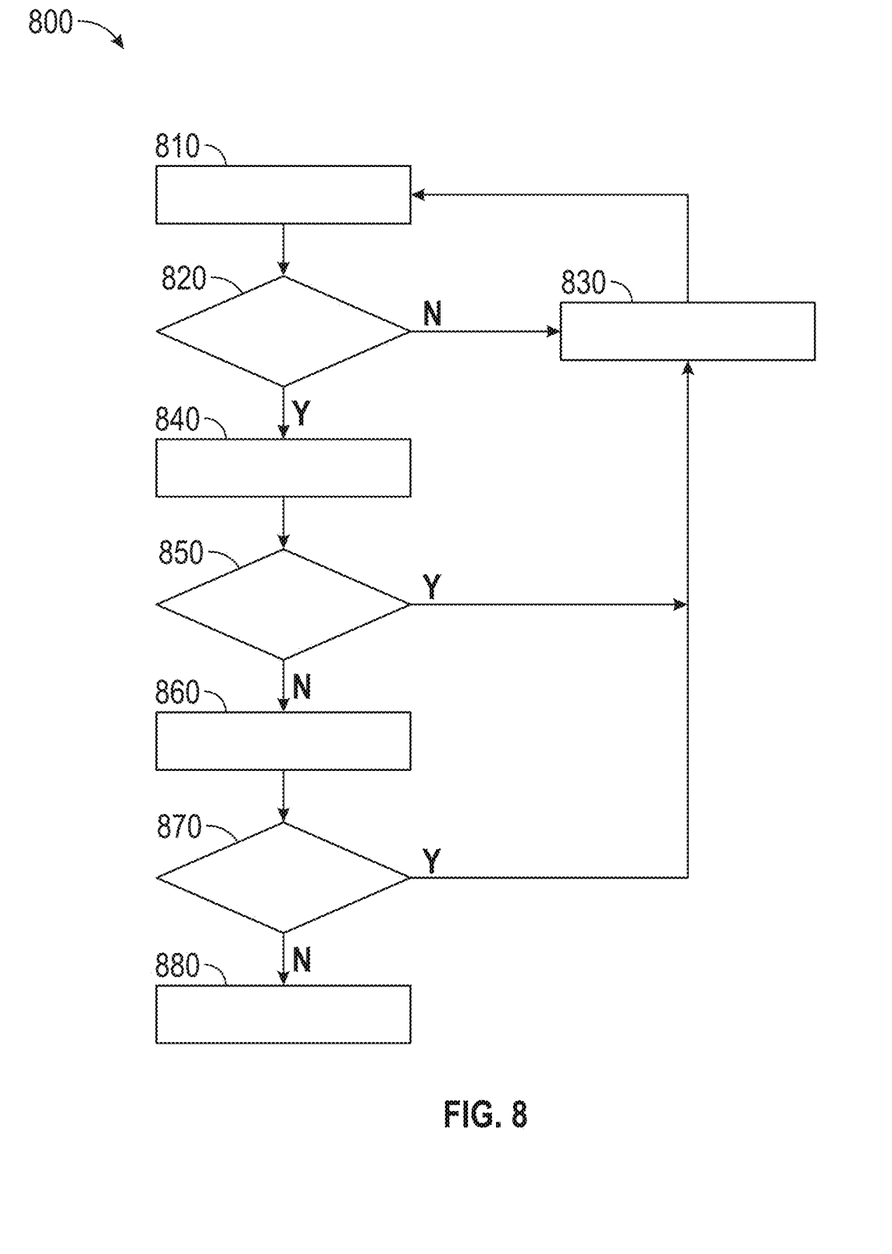
FIG. 8 is a process flow of a method of performing a pre-check of contactor operation to switch from series to parallel connection of the battery packs according to exemplary embodiments.

FIG. 8 is a process flow of a method 800 of performing a pre-check of contactor operation to switch from series to parallel connection of the battery packs 120 according to exemplary embodiments. At block 810, all the switches SA1, SA2, SB1, SB2, SA, SB, and pre-charge circuit contactors 140-A, 140-B are opened. At block 820, a check is done of whether the voltage Vout is 0, as it should be. If the check at block 820 indicates that the voltage Vout is not 0, then debugging is performed at block 830. If the check at block 820 indicates that the voltage Vout is 0, as it should be, then the switch SA1 is closed at block 840.

At block 850, a check is done of whether the second probe voltage VP2 exceeds a predefined threshold voltage Vthreshold based on the switch SA1 being closed at block 840. If the check at block 850 indicates that the second probe voltage VP2 does exceed the threshold voltage Vthreshold, which it should not, then debugging is implemented at block 830. If the check at block 850 indicates that the second probe voltage VP2 does not exceed the threshold voltage Vthreshold, as expected, then, at block 860, switch SA1 is opened again, and the pre-charge circuit contactor 140-B is closed.

At block 870, a check is done of whether the first probe voltage VP1 exceeds the predefined threshold voltage Vthreshold based on the pre-charge circuit contactor 140-B being closed at block 860. If the check at block 870 indicates that the first probe voltage VP1 does exceed the threshold voltage Vthreshold, which it should not, then debugging is implemented at block 830. If the check at block 870 indicates that the first probe voltage VP1 does not exceed the threshold voltage Vthreshold, as expected, then, at block 880, the process of switching to parallel connection of the battery packs 120 is continued.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   a plurality of contactors configured to open or close a connection from two or more battery packs that are configured to power one or more motors of the vehicle to move the vehicle;
   a controller configured to control the plurality of contactors to connect the two or more battery packs in series according to one of a plurality of modes of operation or to connect the two or more battery packs in parallel according to another of the plurality of modes of operation, and to control the plurality of contactors to test an operation of one or more of the plurality of contactors; and
   one or more pre-charge resistors,
   wherein the controller is configured to control the plurality of contactors to connect the two or more battery packs to one or more of the one or more pre-charge resistors during an activation or a deactivation of any of the plurality of modes of operation.

2. The system according to claim 1, wherein the controller is configured to test the operation of the one or more of the plurality of contactors prior to initiating one of the plurality of modes of operation.

3. The system according to claim 1, wherein the controller is configured to test the operation of the one or more of the plurality of contactors prior to terminating one of the plurality of modes of operation.

4. The system according to claim 1, wherein a first contactor among the plurality of contactors connects a first battery pack among the two or more battery packs to a first pre-charge resistor among the one or more pre-charge resistors and a second contactor and a third contactor among the plurality of contactors connect the first battery pack to the one or more motors.

5. The system according to claim 4, wherein the controller is configured to control the first contactor to close while controlling the second contactor and the third contactor to open to test the operation of the second contactor and the third contactor based on whether current flows through the first pre-charge resistor.

6. The system according to claim 4, wherein the controller is configured to control the second contactor to open while controlling the third contactor to close to test the operation of the second contactor based on whether voltage across the one or more motors is dropping.

7. The system according to claim 4, wherein the controller is configured to control the third contactor to open while controlling the second contactor to close to test the operation of the third contactor based on whether voltage across the one or more motors is dropping.

8. The system according to claim 1, wherein the controller is configured to obtain voltage measurements through each of the two or more battery packs individually.

9. A method of assembling a system in a vehicle, the method comprising:
   arranging a plurality of contactors to open or close a connection from two or more battery packs that are configured to power one or more motors of the vehicle to move the vehicle;
   configuring a controller to control the plurality of contactors to connect the two or more battery packs in series according to one of a plurality of modes of operation or to connect the two or more battery packs in parallel according to another of the plurality of modes of operation, and to control the plurality of contactors to test an operation of one or more of the plurality of contactors; and
   arranging one or more pre-charge resistors,
   wherein the configuring the controller includes the controller controlling the plurality of contactors to connect the two or more battery packs to one or more of the one or more pre-charge resistors during an activation or a deactivation of any of the plurality of modes of operation.

10. The method according to claim 9, wherein the configuring the controller includes the controller testing the operation of the one or more of the plurality of contactors prior to initiating one of the plurality of modes of operation.

11. The method according to claim 9, wherein the configuring the controller includes the controller testing the operation of the one or more of the plurality of contactors prior to terminating one of the plurality of modes of operation.

12. The method according to claim 9, wherein the arranging the plurality of contactors includes a first contactor among the plurality of contactors connecting a first battery pack among the two or more battery packs to a first pre-charge resistor among the one or more pre-charge resistors and a second contactor and a third contactor among the plurality of contactors connecting the first battery pack to the one or more motors.

13. The method according to claim 12, wherein the configuring the controller includes the controller controlling the first contactor to close while controlling the second contactor and the third contactor to open to test the operation of the second contactor and the third contactor based on whether current flows through the first pre-charge resistor.

14. The method according to claim 12, wherein the configuring the controller includes the controller controlling the second contactor to open while controlling the third contactor to close to test the operation of the second contactor based on whether voltage across the one or more motors is dropping.

15. The method according to claim 12, wherein the configuring the controller includes the controller controlling the third contactor to open while controlling the second contactor to close to test the operation of the third contactor based on whether voltage across the one or more motors is dropping.

16. The method according to claim 9, wherein the configuring the controller includes the controller obtaining voltage measurements through each of the two or more battery packs individually.

17. The system according to claim 1, wherein the controller is further configured to perform a pre-check to verify that all contactors are in an open position by determining that an output voltage is zero prior to activating any mode of operation.

18. The system according to claim 1, wherein the controller is configured to perform a post-check by sequentially opening contactors and monitoring for a corresponding drop in output voltage to confirm proper operation of each contactor.

19. The system according to claim 1, wherein the controller is configured to identify a fault condition and initiate a debugging process if a current is detected through a pre-charge resistor when only a single contactor is closed.

20. The system according to claim 1, wherein the controller is configured to measure probe voltages at two or more points in the system to individually monitor the voltage of each battery pack.

* * * * *